Nov. 22, 1955  J. W. ORENDORFF  2,724,491
CONVEYOR FLIGHT BAR CUSHION
Filed Jan. 15, 1953
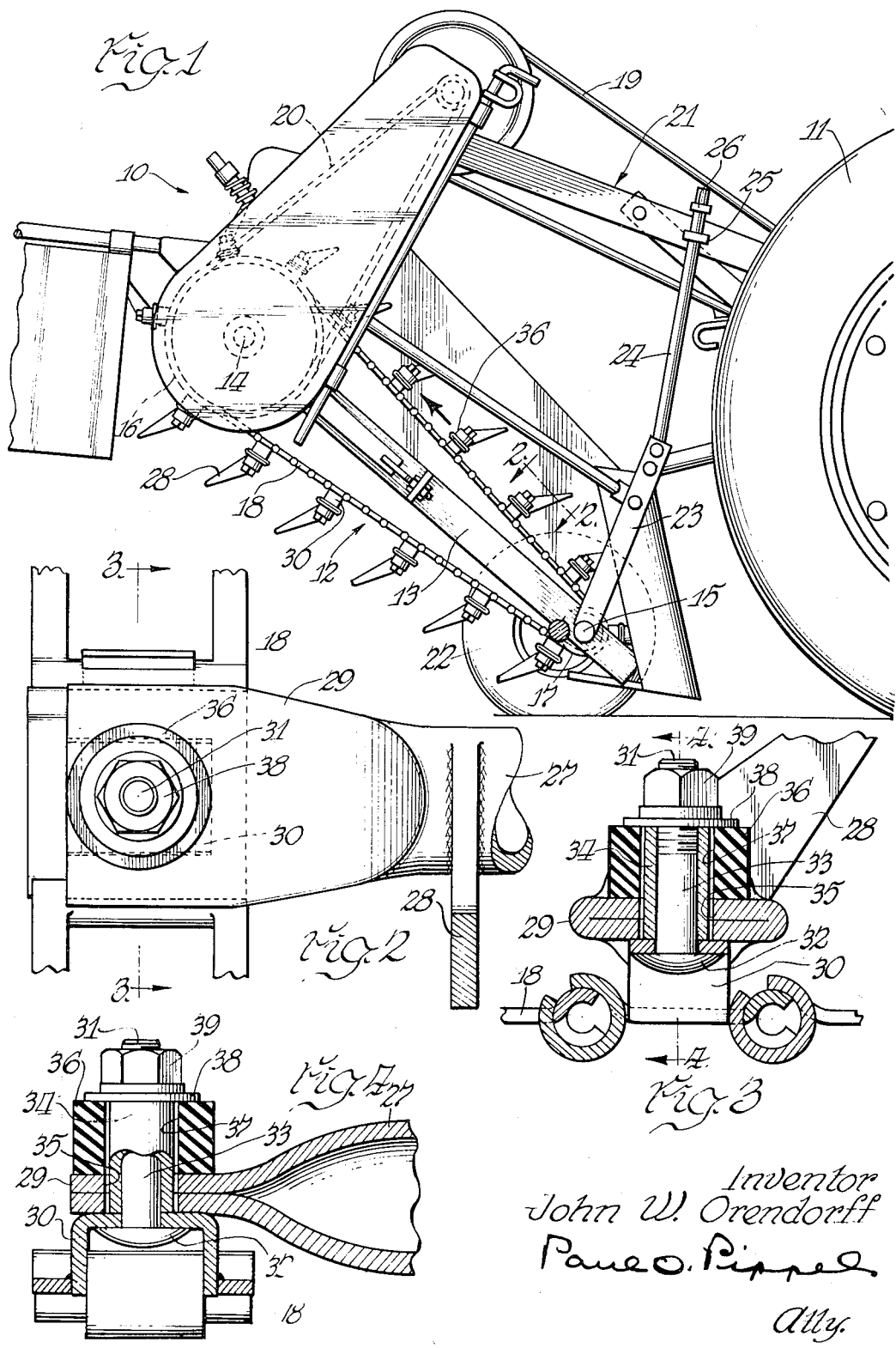
Inventor
John W. Orendorff
Paul O. Pippel
Atty.

2,724,491

CONVEYOR FLIGHT BAR CUSHION

John W. Orendorff, Canton, Ill., assignor to International Harvester Company, a corporation of New Jersey Application January 15, 1953, Serial No. 331,459

7 Claims. (Cl. 198—197)

This invention relates to conveyors and particularly to the pickup type of conveyor utilized in machinery for harvesting agricultural crops. More specifically the invention concerns improved mechanism for mounting flight bars upon a pickup conveyor to offset the effects of shocks encountered in operation.

The invention will be described in its relation to a peanut harvester such as that described in more detail in copending application, Serial No. 288,918, filed May 20, 1952 and now Patent No. 2,690,640. In such a harvester one end of the pickup conveyor travels close to the ground and is subject to damage from shocks encountered in operation upon engagement of the teeth of the conveyor with the crop and with obstructions in the path of travel.

The principal object of the invention is the provision of an improved pickup conveyor construction for peanut harvesters and the like.

Another object of the invention is the provision of an improved mounting for the pickup mechanism of a peanut harvester or the like to cushion the flight bars against injury during operation.

Another object of the invention is the provision of cushioning mechanism for mounting flight bars upon the chains of the pickup conveyor to avoid damage thereto in operation.

Other objects and advantages of the invention will become clear from the following detailed description when read in conjunction with the accompanying drawings, wherein:

Figure 1 is a view in side elevation showing a peanut harvester embodying the features of this invention.

Figure 2 is a plan view, partly in section, taken on the line 2—2 of Figure 1, of the means for attaching one end of a flight bar to its associated conveyor chain.

Figure 3 is a sectional view on the line 3—3 of Figure 2, and

Figure 4 is a sectional view taken on the line 4—4 of Figure 3.

Referring to the drawings, the peanut harvester incorporating the features of this invention is designated generally by the numeral 10 and is mounted upon a tractor 11. Although no detailed description of the peanut harvester is indicated, it might be noted generally that a conveyor 12 is provided which constitutes a combined crop pickup and shaker mechanism adapted to pick up from the ground the previously dug peanuts and vines, to convey them upwardly and rearwardly in the direction of the arrow in Figure 1, shaking the vines to loosen dirt and the like therefrom and to deliver them rearwardly for collection.

The combination pickup conveyor and shaker 12 includes laterally spaced frame members 13, only one of which is shown in the drawing. This frame supports at its upper rear end a transversely extending shaft 14 and at its forward lower end a transverse shaft 15. These shafts carry laterally spaced pairs of sprocket wheels 16 and 17, respectively, upon which are trained laterally spaced endless chains 18, only one of which is shown.

The sprocket wheels 16 are driven from a source of power on the tractor through suitable power transmission mechanism including drive belts 19 and 20 and the implement is mounted upon the tractor to be carried thereon by a supporting structure 21 in a manner more fully described in the copending application above referred to.

The forward end of the conveyor 12 rides close to the ground upon a pair of laterally spaced wheels 22 and is capable of vertical floating movement, a hanger 23 being connected by a pivoted link 24 to the supporting structure 21. The link 24 is slidably received in an eye-bolt 25 secured to the supporting frame 21. A collar 26 on the link 24 prevents displacement thereof from the eye-bolt.

The laterally spaced chains 18 of the conveyor are connected at spaced locations by a plurality of flight bars 27, each of which has mounted thereon a plurality of fingers or teeth 28 which project at an angle rearwardly from the flight bar and are adapted to engage the crop which has been dug and laid upon the surface of the ground. The forward lower end of the conveyor, as is clear from Figure 1, is smaller than the upper rear end thereof and the crop is picked up by the fingers and thrown upon the conveyor to be moved rearwardly and dropped from the upper end of the conveyor. Engagement of the teeth 28 with obstructions imparts a severe strain on the chains 18 which, in the past, has resulted in frequent breakage thereof during operation requiring delays and costly repairs.

The flight bar 27 is provided with a flattened portion 29 at its end and this flattened end of the flight bar engages a U-shaped bracket 30 affixed to the chain, a number of such brackets being provided at spaced locations along the length of the chain for attachment of flight bars thereto. As is indicated clearly in Figures 3 and 4, the flight bar 27 is attached to the bracket 30 by means including a bolt 31 having a head 32 and a shank 33 extending through an opening in the upper face of the bracket 30 and having its upwardly projecting shank 33 surrounded by a bushing or sleeve 34 receivable in an oversized opening 35 provided in the flattened portion 29 of the flight bar, and the lower end of which rests upon the upper face of the bracket 30. A flexible, preferably rubber cushioning block 36 rests upon the upper face of the flattened portion 29 of the flight bar and is also provided with an oversized opening 37 to receive bushing 34 and to accommodate looseness therebetween and the block 36. The cushioning assembly is held in place by the provision of a washer 38 engageable with the upper end of the bushing 34 and of the block 36, and a nut 39 is provided on the threaded upper end of the bolt 31 to secure the parts together.

A force exerted upwardly and rearwardly against one of the teeth 28 on the lower course of the conveyor chain 18, as viewed in Figure 1, will permit the end of the flight bar 27 to rock about a pivot represented by the engagement of the flattened portion 29 with the bracket 30 within limits defined by openings 35 and 37. This relative movement of the flight bar 27 and the bracket 30 is permitted by flexibility of the rubber block 36, and although the flattened portion 29 of the flight bar is in direct contact with the bracket 30, the shock of one or more of the fingers 28 encountering an obstruction is taken up by the cushioning block 35 so that all danger of the breakage of the conveyor chains and attaching parts is eliminated.

The operation of the shock absorbing flight bar mounting of this invention should be clearly understood from the foregoing description. It should likewise be understood that modifications may be made in the construc-

What is claimed is:

1. In a conveyor a pair of laterally spaced driven endless chain members, metal flight bars extending between and connecting said chain members at spaced intervals, said flight bars having radially projecting teeth thereon and an attaching portion at each end, a complementary attaching portion on each said chain member for connection to the attaching portion at the adjacent end of the flight bar, and means for avoiding the transmission of shock between the flight bar and the chain comprising a block of resilient material engaging one of said attaching portions, and connecting means between the block of resilient material, the flight bar and the chain attaching portion for securing them together.

2. The invention set forth in claim 1, wherein looseness is provided between said connecting means and the resilient block and metal attaching portions to accommodate relative pivotal movement therebetween.

3. The invention set forth in claim 1, wherein said attaching portions are in engagement and the resilient block is in engagement with only one of said attaching portions.

4. The invention set forth in claim 2, wherein openings are provided in the center of said resilient block and in said attaching portions, and a bolt of lesser diameter than said openings is passed therethrough for securing said parts together.

5. In a crop harvester and conveyor of the type adapted to be mounted upon a traveling support in a position to engage the crop to be harvested, in combination, laterally spaced metallic endless chain members, a plurality of metal flight bars connecting said chain members at spaced intervals, each said flight bars having radially projecting crop-engaging teeth and an attaching portion at its ends for connection to the chain members, a complementary attaching portion on each chain member for connection to the adjacent end of the flight bar, a shock absorber comprising a block of resilient material on the side of the flight bar opposite the attaching portion on the chain, and means for clamping said attaching portions together.

6. The invention set forth in claim 4, wherein the bolt is surrounded by a bushing of lesser diameter than the openings in the resilient block and the flight bar, said bushing operatively engaging the flight bar, and a nut is provided on the bolt for engagement with the other end of the bushing.

7. In a conveyor comprising spaced endless metallic chain members, metal flight bars extending between said chain members at spaced intervals, each said flight bar being flattened at its ends to provide an attaching portion for connection to said chain members and having a face parallel to the plane of the conveyor, a complementary connecting bracket on each chain having an attaching portion for connection to the adjacent end of the flight bar, each said bracket attaching portion having a flattened face parallel to the adjacent face of the flight bar attaching portion, bolt means extending through said attaching portions, and a block of resilient material engaging one of said attaching portions, said block being apertured to receive said bolt means, and said aperture being larger in diameter than the bolt, to accommodate relative angular movement between said attaching portions.

References Cited in the file of this patent

UNITED STATES PATENTS

| | | |
|---|---|---|
| 1,779,720 | Wood | Oct. 28, 1930 |
| 2,564,688 | Hapman | Aug. 21, 1951 |